United States Patent

Sandusky et al.

[11] Patent Number: 5,825,571
[45] Date of Patent: Oct. 20, 1998

[54] INPUT SWITCHING NETWORK

[75] Inventors: Randall L. Sandusky, Divide; Gary J. Asakawa, Colorado Springs, both of Colo.

[73] Assignee: Texas Instruments Incorporated, Dallas, Tex.

[21] Appl. No.: 887,684

[22] Filed: Jul. 3, 1997

Related U.S. Application Data

[63] Continuation of Ser. No. 493,630, Jun. 22, 1995, abandoned.

[51] Int. Cl.[6] ............................... G11B 5/02; G11B 5/09; G11B 15/12
[52] U.S. Cl. .................................. 360/67; 360/46; 360/62
[58] Field of Search ................................... 360/46, 67, 62

[56] References Cited

U.S. PATENT DOCUMENTS 5,446,601   8/1995   Fukuta ........................................ 360/46

OTHER PUBLICATIONS

"Microelectronics" Millman et al., 1987, pp. 167–169.

*Primary Examiner*—Aristotelis M. Psitos
*Assistant Examiner*—Regina Y. Neal
*Attorney, Agent, or Firm*—W. Daniel Swayze, Jr.; Wade James Brady, III; Richard L. Donaldson

[57] ABSTRACT

A circuit for input switching for a read channel is described. The present invention suppresses unwanted signals at the input of a read channel. The present invention uses an open impedance switching circuit to inhibit AC transients during DC bias restoration. One embodiment of the present invention uses a low impedance switching circuit to provide rapid restoration of DC bias levels. Coordination of the operation of the open impedance switching circuit and the low impedance switching circuit is provided to maximize suppression of unwanted signals.

25 Claims, 8 Drawing Sheets

INPUT SWITCHING NETWORK

This application is a Continuation, of application Ser. No. 08/493,630 filed on Jun. 22, 1995, now abandoned.

BACKGROUND OF THE INVENTION

1. Field of the Invention

The present invention relates to data storage media in general and to a method and apparatus for suppressing unwanted signals at the input of a read channel.

2. Background Art

Data storage devices, for example, disk drives, are often used to store data for later use. A typical data storage device includes storage media, in which data is stored, a read head, and a mechanism, such as a motor, for imparting relative motion between the storage media and the read head. The relative motion allows access to various portions of the storage media, and, in the case of certain types of media, such as magnetic media, allows for the production of signals representative of the data stored in the storage media. A read channel circuit is used to convert signals from the storage media to usable read data.

FIG. 1 is a block diagram illustrating a typical read channel for a disk drive. Data head 102 reads data from data disk 101 and provides a signal at nodes 120 and 121 to preamplifier circuit 103. Preamplifier 103 amplifies the signal and provides a preamplified output to a first terminal of capacitor 104 at node 122 and to a first terminal of capacitor 105 at node 123. Capacitors 104 and 105 couple the preamplified signal to the inputs of automatic gain control (AGC) amplifier 106. Capacitors 104 and 105 couple alternating current (AC) while blocking direct current (DC). The second terminal of capacitor 104 is coupled to a first input of AGC amplifier 106 at node 124, and the second terminal of capacitor 105 is coupled to a second input of AGC amplifier 106 at node 125.

AGC amplifier 106 provides an output across nodes 126 and 127. The first output node 126 is coupled to a first terminal of capacitor 107, and the second output node 127 is coupled to a first terminal of capacitor 108. The second terminal of capacitor 107 is coupled to an input of programmable filter circuit 109 at node 128. The second terminal of capacitor 108 is coupled to an input of programmable filter circuit 109 at node 129. AGC amplifier circuit 106 and programmable filter circuit 109 amplify and filter the signal to obtain the desired amplitude and frequency characteristics to allow accurate recovery of the recorded information.

Programmable filter 109 is capacitively coupled to pulse detector/qualifier 114 via capacitors 110, 111, 112, and 113. Programmable filter 109 is coupled to a first terminal of capacitor 110 at node 130, to a first terminal of capacitor 111 at node 131, to a first terminal of capacitor 112 at node 132, and to a first terminal of capacitor 113 at node 133. Pulse detector/qualifier 114 is coupled to a second terminal of capacitor 110 at node 134, to a second terminal of capacitor 111 at node 135, to a second terminal of capacitor 112 at node 136, and to a second terminal of capacitor 113 at node 137. Servo demodulator 115 is coupled to the second terminal of capacitor 112 and to pulse detector/qualifier 114 at node 136 and to the second terminal of capacitor 113 and to pulse detector/qualifier 114 at node 137. Servo demodulator 115 provides outputs at nodes 138 and 139.

Pulse detector/qualifier 114 converts the signal into pulses from which digital binary data can be extracted. Although AGC amplifier circuit 106 may be AC coupled to programmable filter circuit 109, such as with capacitors 107 and 108, these elements may alternatively be coupled more directly without the need for such capacitors. Likewise, although programmable filter circuit 109 may be AC coupled to pulse detector/qualifier 114, such as with capacitors 110, 111, 112, and 113, these elements may alternatively be coupled more directly without the need for such capacitors.

A serial data terminal is coupled to serial port circuit 116 at node 140. A serial clock terminal is coupled to serial port circuit 116 at node 141. A serial data enable terminal is coupled to serial port circuit 116 at node 142. Serial port circuit 116 is coupled to data bus 143. Data bus 143 is also coupled to programmable filter circuit 109, pulse detector/qualifier 114, servo demodulator 115, time base generator 117, and data separator 118. Serial port circuit 116 allows access to data bus 143, allowing features and operating modes of the read channel to be adjusted or changed.

Read data detected by pulse detector/qualifier 114 is provided to data separator 118 via read data signals RD+ and RD− at nodes 148 and 149, respectively. A reference frequency input is applied to time base generator 117 at node 144. An output of time base generator 117 is provided to data separator 118 at node 145. An output of data separator 118 is provided to RLL decoder 119 at node 146. An output of RLL decoder 119 is provided at node 147. The output at node 147 is preferably in a non-return-to-zero (NRZ) format. Time base generator 117 and data separator 118 serve to synchronize the data to a fixed reference frequency clock, thereby enabling RLL decoder 119 to decode the data into the NRZ format.

A data storage device may have several modes of operation. For example, a device may have a read mode during which data is read from the media, a write mode during which data is written to the media, a signal gap mode between the read mode and the write mode during which no reading or writing activity occurs, and a servo mode during which positional information is derived from the storage media to maintain the correct relationship between the read head and the storage media. The read channel allows signals from the storage media to be converted to read data during the read mode. However, during the write mode, data is being written to the storage media, and no read data is present. Thus, it is desirable to mute the signals applied to the read channel during the write mode. Likewise, since no read signals are present during the signal gap mode, it is also desirable to mute the signals applied to the read channel during the signal gap mode.

Furthermore, during transitions between operating modes of a read channel circuit, the output bias level of the preamplifier circuit often changes, causing a step in the voltage across the capacitors that couple the outputs of the preamplifier circuit. Since the voltage across these capacitors cannot change instantaneously, the bias voltage of the AGC amplifier circuit is disturbed temporarily, causing signal distortion in the read channel and possible errors in the recovery of read data. Over time, the capacitor offset voltage is discharged, usually with some finite time constant, restoring the proper DC bias levels to the AGC amplifier circuit. In addition, if spurious signals applied to the read channel are not muted, they may inject noise into the AGC amplifier circuit and saturate the AGC amplifier circuit, requiring a recovery time before valid read signals may be processed.

In the past, attempts have been made to mute spurious signals present at the read channel when valid read signals are not present. However, these attempts have often been ineffective at muting spurious signals, at reducing recovery time, or at maintaining proper DC bias levels.

FIG. 2 is a schematic diagram illustrating a prior art read channel input circuit. Preamplifier circuit 201 receives an input from a data head at nodes 209 and 210. Preamplifier circuit 201 amplifies the received signal and provides a preamplified output at nodes 211 and 212. Node 211 is coupled to a first terminal of capacitor 202, and node 212 is coupled to a first terminal of capacitor 203. The second terminal of capacitor 202 is coupled to node 213, and the second terminal of capacitor 203 is coupled to node 214. Node 213 is coupled to a non-inverting input of AGC amplifier circuit 208, to a first terminal of resistor 204, and to a first terminal of switch 206. Node 214 is coupled to an inverting input of AGC amplifier 208, to a first terminal of resistor 205, and to a first terminal of switch 207. Bias voltage source Vbias at node 215 is coupled to a second terminal of each of resistors 204 and 205 and to a second terminal of each of switches 206 and 207. Control input LowZ En at node 216 is coupled to switches 206 and 207 to control the operation of switches 206 and 207. AGC amplifier circuit 208 receives input from nodes 213 and 214 and provides output at nodes 217 and 218.

The inputs to AGC amplifier circuit 208 at nodes 213 and 214 are biased to the DC voltage of bias voltage source Vbias through resistors 204 and 205, respectively, thereby assuring proper biasing of the AGC amplifier inputs for the high frequency AC signals that are coupled by capacitors 202 and 203 from preamplifier circuit 201. Switches 206 and 207, which may be implemented as semiconductor switches, such as field effect transistor (FET) switches, provide a current path in parallel with resistors 204 and 205, respectively, when signal LowZ En is asserted. When switches 206 and 207 are closed, they reduce the input impedance of the bias stage, allowing the DC bias voltage on capacitors 202 and 203 to be rapidly restored during transient mode changes. Switches 206 and 207 also attenuate the high frequency signal at nodes 213 and 214 while they are closed to reduce the possibility of saturation in the following amplifier stages due to unwanted transients.

However, there are several disadvantages to the prior art technique described above. One disadvantage is that sample and hold effects can occur and degrade performance. If switches 206 and 207 are opened during a time when there is a transient or high frequency signal present at nodes 213 and 214, a "sample and hold" of the transient voltage will occur, requiring a period of time to elapse while the excess charge in capacitors 202 and 203 is discharged. The voltage across capacitor 202 is normally equal to $V_{op}-V_{ia}$, where $V_{ia} \approx V_{bias}$, $V_{op}$ is equal to the voltage at node 211, $V_{ia}$ is equal to the voltage at node 213, and $V_{bias}$ is equal to the voltage at node 215. If there is a voltage excursion of $\Delta V$ at node 211 immediately preceding the deassertion of the LowZ En signal, then $V_{op}-\Delta V=V_{ia} \approx V_{bias}$. Since the voltage across capacitor 202 does not change instantaneously, the voltage at node 213 becomes $Via+\Delta V \approx V_{bias}+\Delta V$ when switch 206 is opened. Thus, the bias voltage at node 213 at the input of AGC amplifier 208 has been disturbed by a voltage of magnitude $\Delta V$, possibly distorting the response of any succeeding amplifier stages. This disturbance will continue to affect performance while the charge represented by the voltage $\Delta V$ is discharged with a time constant equal to the product of the resistance of resistor 204 and the capacitance of capacitor 202.

Another disadvantage of the prior art circuit is poor attenuation of transient signals. Since FET switches have a finite resistance in the closed state, they do not function as perfect conductors. In fact, the minimum resistance of FET switches is often in the range of several hundred ohms. The difficulty of producing low impedance FET switches limits the ability of switches 206 and 207 to reduce the source impedance of bias voltage source $V_{bias}$ as seen from nodes 213 and 214. Thus, the amount of attenuation provided by switches 206 and 207 to signals present at nodes 213 and 214 is limited, and unwanted high frequency transients may still propagate through the read channel with undesirable effects.

FIG. 5 is a diagram illustrating waveforms resulting from the operation of the read channel input circuit illustrated in FIG. 2. The signal represented by waveform 501 is present across the outputs of preamplifier circuit 201 at nodes 211 and 212. The signal across outputs 217 and 218 of AGC amplifier circuit 208 is illustrated as waveform 502. When signal LowZ En has not been asserted and a high frequency signal is present across the outputs of preamplifier circuit 201 at nodes 211 and 212 as illustrated by waveform 501, the high frequency signal is also present in waveform 502 at an unattenuated amplitude.

At transition 504, signal LowZ En is asserted. After signal LowZ En has been asserted, switches 206 and 207 are closed, and the high frequency signal of waveform 502 is attenuated relative to waveform 501. The amount of attenuation depends upon the resistance of switches 206 and 207 in their closed positions, the resistance of resistors 204 and 205, and the frequency of the signal of waveform 501. At transition 505, signal LowZ En is restored to its inactive state, switches 206 and 207 are opened, and the high frequency signal of waveform 502 returns to its previous level over a period of time characterized by an exponential time constant.

The gradual restoration of waveform 502 to full amplitude after switches 206 and 207 are opened results from a sample and hold effect. If switches 206 and 207 are opened during a time when there is a transient or high frequency signal present at nodes 211 and 212, capacitors 202 and 203 will tend to sample and hold the transient voltage. With switches 206 and 207 open, the excess charge present on capacitors 202 and 203 associated with the transient voltage will then discharge through resistors 204 and 205 until the proper bias voltage is restored at nodes 213 and 214. Capacitors 202 and 203 form RC circuits with resistors 204 and 205, resulting in exponential time constants for the restoration of proper bias voltages at nodes 213 and 214.

FIG. 3 is a schematic diagram illustrating another prior art read channel input circuit. Preamplifier circuit 301 receives an input from a data head at nodes 306 and 307. Preamplifier circuit 301 amplifies the received signal and provides a preamplified output at nodes 308 and 309. Node 308 is coupled to a first terminal of capacitor 302, and node 309 is coupled to a first terminal of capacitor 303. The second terminal of capacitor 302 is coupled to node 310, and the second terminal of capacitor 303 is coupled to node 311. Nodes 310 and 311 are coupled to inputs of transconductance squelch circuit 304. The outputs of transconductance squelch circuit 304 are provided at nodes 312 and 313. Control input. Squelch En at node 316 is coupled to transconductance squelch circuit 304 to control its operation. AGC amplifier circuit 305 receives input from nodes 312 and 313 and provides output at nodes 314 and 315.

By adding a transconductance squelch circuit between the AC coupling capacitors and the AGC amplifier circuit inputs, effective suppression of high frequency signals at the AGC amplifier circuit inputs is provided when the Squelch En input is enabled. Upon deassertion of the Squelch En input, however, the bias conditions of the squelch circuit as well as those of the AGC amplifier circuit require a recovery time period that prevents the effective use of the signal channel until the proper bias levels are restored. This problem may be compounded by effects such as the sample and hold effect described earlier which may allow transmission of a spurious signal through the read channel when restoring bias levels, thereby causing unwanted distortion or saturation of amplifier stages and requiring additional recovery time.

FIG. 4 is a schematic diagram illustrating another prior art read channel input circuit. A signal from a data head is provided at inputs 409 and 410. Input 409 is coupled to the non-inverting input of preamplifier circuit 401. Input 410 is coupled to the inverting input of preamplifier circuit 401. Preamplifier circuit 401 provides an output signal across outputs 411 and 412. Output 411 of preamplifier circuit 401 is coupled to a first terminal of capacitor 402. Output 412 of preamplifier 401 is coupled to a first terminal of capacitor 403. A second terminal of capacitor 402 is coupled to a first terminal of switch 404 at node 413. A second terminal of capacitor 403 is coupled to a first terminal of switch 405 at node 414.

A second terminal of switch 404 is coupled to a non-inverting input of AGC amplifier circuit 408 and to a first terminal of resistor 406 at node 415. A second terminal of switch 405 is coupled to an inverting input of AGC amplifier circuit 408 and to a first terminal of resistor 407 at node 416. A second terminal of resistor 406 and a second terminal of resistor 407 are coupled to bias voltage source Vbias at node 419. AGC amplifier circuit 408 provides an output signal across nodes 417 and 418. Control signal HighZ En at node 420 is provided to switches 404 and 405 to control switches 404 and 405.

When the read channel circuit of FIG. 4 enters a write mode, the control signal HighZ En is asserted, and switches 404 and 405 open the path between nodes 413 and 415 and the path between nodes 414 and 416, respectively. While the signal path is interrupted, signals from preamplifier circuit 401 do not pass to the inputs of AGC amplifier 408. Control signal HighZ En is asserted through the write mode and the signal gap mode. At the beginning of the read mode, control signal HighZ En is deasserted to allow signals derived from the data head to pass to the inputs of AGC amplifier 408 so that data may be read from the storage media. Control signal HighZ En may also-be asserted during a servo mode if it is desired to mute the signals at the inputs of AGC amplifier circuit 408 during the servo mode.

However, the read channel circuit of FIG. 4 does not provide complete suppression of transients or high frequency signals. Inevitably; a finite amount of parasitic capacitance exists in switches 404 and 405, allowing unwanted signals to pass to the inputs of AGC amplifier 408. Thus, performance of the read channel circuit of FIG. 4 may be degraded by unwanted signals.

Prior art techniques have historically exhibited numerous disadvantages. For example, prior art techniques have typically suffered from degraded performance because of a sample and hold effect that would propagate spurious signals present during mode changes. Furthermore, prior art techniques have typically offered poor attenuation of spurious signals during periods when signals were intended to be muted. Furthermore, prior art techniques that used a transconductance squelch circuit required an additional stage with additional complexity. Thus, there is a need for a circuit capable of maintaining appropriate bias voltages without the need for long recovery times while effectively attenuating spurious signals and selectively muting signals.

SUMMARY OF THE INVENTION

The present invention provides a circuit for input switching for a read channel. The present invention provides switches in series with a portion of the read channel at the output of a preamplifier to effectively disconnect the output of the preamplifier from an amplifier input bias stage and switches at the amplifier input bias stage for providing a low impedance coupling to a bias voltage source. By disconnecting the preamplifier output from the input bias stage, unwanted transient signals that may be present at the preamplifier output are blocked from affecting the input bias stage and any sample and hold effect that might have occurred at the AC-coupling capacitors is prevented. By providing a low impedance coupling to a bias voltage source, the present invention further attenuates potentially interfering signals. Since the present invention prevents interference with the amplifier input bias stage, time that would otherwise have been required to allow the input bias stage to recover from interference is saved, and improved performance is provided.

In the present invention, a data head reads information from storage media and provides a signal to a first circuit, preferably a preamplifier circuit. The first circuit provides an output that is preferably capacitively coupled to a second circuit, preferably an AGC amplifier circuit. The second circuit has an input bias stage coupled to its inputs. The input bias stage has a given impedance and applies a bias voltage through the elements providing the given impedance so as to appropriately bias the input of the second circuit. A first set of switches is provided to disconnect the path between the first circuit and the second circuit to prevent propagation of spurious signals from the first circuit to the second circuit during modes when valid signals are not expected. A second set of switches is provided to reduce the impedance of the input bias stage to reduce the influence of spurious signals on the second circuit during modes when valid signals are not expected.

In the preferred embodiment, the first set of switches is implemented as complementary metal-oxide semiconductor (CMOS) linear switches or transmission gates comprising an n-channel FET in parallel with a p-channel FET. Alternatively, the first set of switches may be implemented with other switching devices. The second set of switches is preferably implemented as p-channel FETs, although n-channel FETs or other switching devices may alternatively be used. A bias voltage source circuit is provided to supply a source of bias voltage. The bias voltage source circuit has a control input that allows the bias voltage source to be disabled when not needed, allowing power consumption to be minimized.

The preferred embodiment also provides for the proper timing and sequencing of control signals to ensure that the first and second sets of switches are opened and closed at the appropriate times relative to each other and to mode changes of the storage device in which they are used to yield optimum performance. Control of the timing and sequencing of the control signals may be provided by a delay circuit, such as an RC circuit, a one-shot monostable multivibrator, a timer circuit, an analog delay circuit, a digital delay circuit, a digital processor, such as a microcontroller, or another circuit capable of providing the appropriate control capability.

The switches of the present invention allow valid read data signals to be passed along the read channel, but prevent spurious signals from propagating along the read channel. The present invention reduces recovery time of read channel circuitry following mode changes. By reducing recovery time, the present invention also allows read data to be processed more quickly. Thus, the present invention overcomes the disadvantages of the prior art.

DETAILED DESCRIPTION OF THE INVENTION

Figure 1:
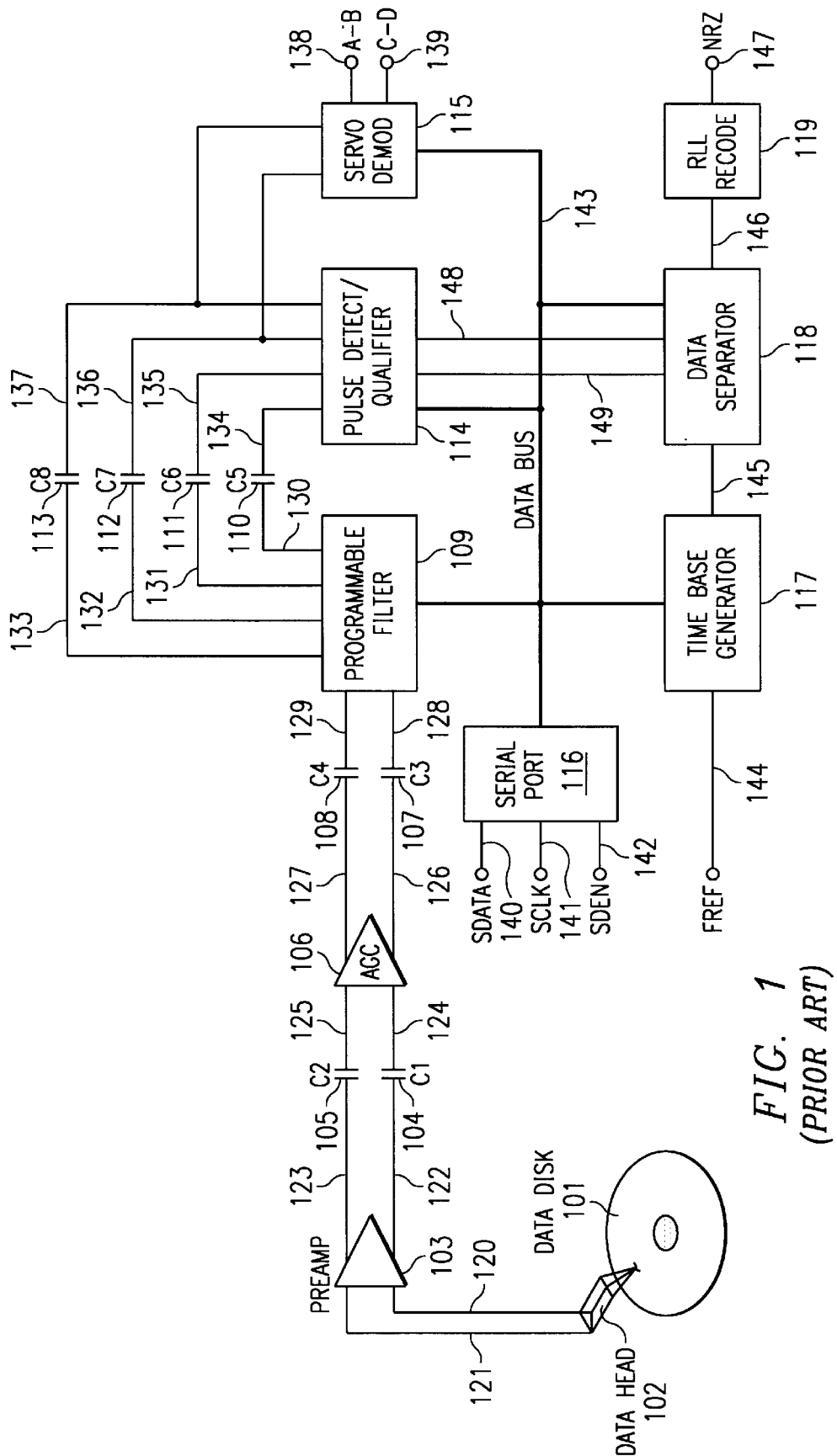
FIG. 1 is a block diagram illustrating a typical read channel for a disk drive.
Figure 2:
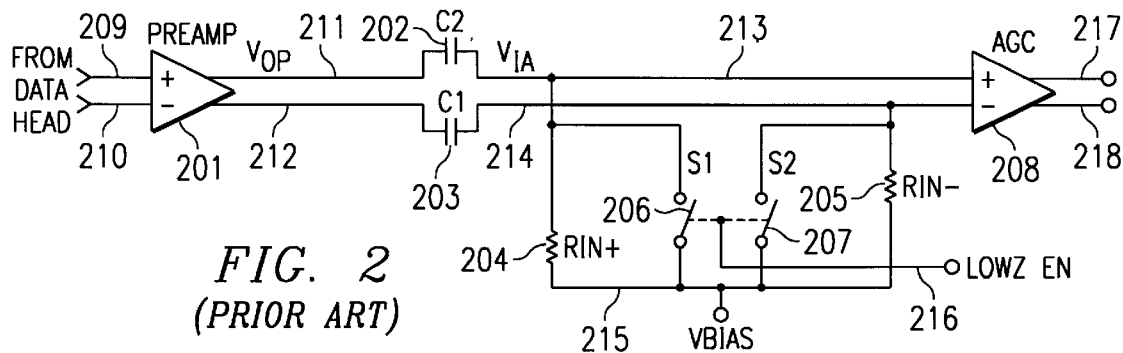
FIG. 2 is a schematic diagram illustrating a prior art read channel input circuit.
Figure 3:
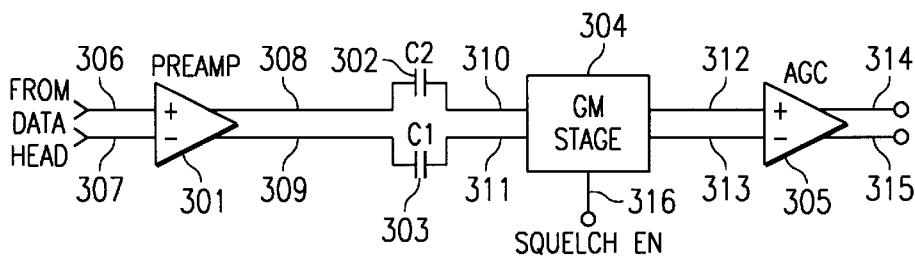
FIG. 3 is a schematic diagram illustrating another prior art read channel input circuit.
Figure 4:
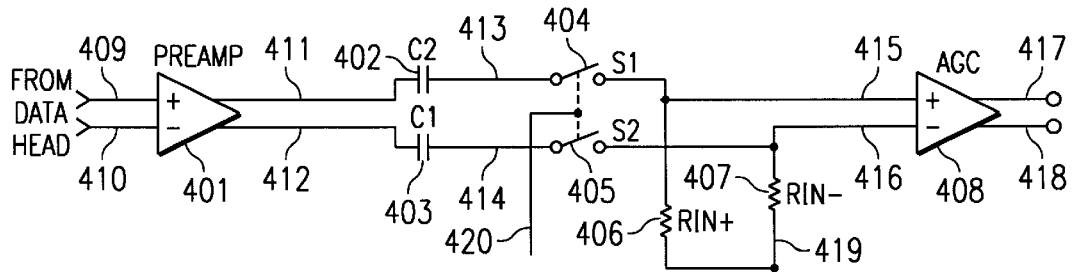
FIG. 4 is a schematic diagram illustrating another prior art read channel input circuit.

A circuit for input switching for a read channel is described. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

The present invention avoids the disadvantages of the prior art. The present invention provides switches between the outputs of a preamplifier circuit and the inputs of an AGC amplifier circuit to allow the inputs of the AGC amplifier circuit to be switched to a high impedance state. In the high impedance state, the signal path between the preamplifier circuit and the AGC amplifier circuit is interrupted. By interrupting the signal path, the sample and hold effect that degrades performance of the prior art circuits is avoided. The present invention also provides switches coupled to the inputs of the AGC amplifier circuit to provide a low impedance coupling to a bias voltage source. The low impedance coupling provides attenuation of interfering signals that leak through parasitic capacitances in prior art circuits.

In one embodiment, the present invention coordinates the operation of switching means in a read channel by opening a circuit carrying signals from a data head of a storage device when valid signals are no longer present, such as at the beginning of a write mode, then after a time period, closing a circuit providing a low impedance coupling between a bias voltage source and an amplifier input, thereby improving performance of a read channel of a storage device. When the storage device enters a mode in which the data head provides a valid signal to the read channel, such as a read mode, the low impedance circuit is opened, then after a time period, the circuit carrying signals from the data head is closed.

The present invention may also be used to prevent interference during a servo gate mode. For use during the servo gate mode, the circuit carrying signals from the data head is opened at the beginning of the servo gate mode and, following a time period, the low impedance bias stage circuit is closed.

In one embodiment, the present invention includes a preamplifier circuit for receiving an input signal and for producing a preamplified signal, a capacitor coupled to the preamplifier circuit for coupling the preamplified signal, a first switching means coupled to the capacitor for switching the preamplified signal, an amplifier circuit having an amplifier circuit input coupled to the first switching means for receiving the preamplified signal and for producing an amplified signal at an amplifier circuit output, a resistor coupled to the amplifier input and to a bias voltage source, and a second switching means coupled across the resistor for selectively bypassing the resistor. An automatic gain control (AGC) amplifier circuit may be used as the amplifier circuit. The present invention may also include a first control means coupled to the first switching means for opening the first switching means at a beginning of a write mode and for closing the first switching means at a beginning of a read mode. Additionally, the present invention may include a second control means coupled to the second switching means for closing the second switching means after the first switching means has been opened and for opening the second switching means before the first switching means has been closed. Alternatively, a single control means may be used to control both the first and second switching means. The first and second switching means are preferably metal oxide semiconductor (MOS) devices.

One embodiment of the present invention includes a preamplifier circuit having a differential preamplifier input and a differential preamplifier output, wherein the differential preamplifier output comprises a first node and a second node, and the preamplifier circuit provides a preamplified signal at the differential preamplifier output. This embodiment also includes a first capacitor coupled to the first node and to a third node, a second capacitor coupled to the second node and a fourth node. Both the first and second capacitors are for coupling the preamplified signal. This embodiment also includes a first switching means coupled to the third node and to a fifth node and a second switching means coupled to the fourth node and to a sixth node. The first and second switching means are for switching the preamplified signal. This embodiment of the present invention also includes an automatic gain control (AGC) amplifier circuit having a differential AGC amplifier input and a differential AGC amplifier output. The differential AGC amplifier input is coupled to the fifth and sixth nodes. The AGC amplifier circuit is for amplifying the preamplified signal. This embodiment further includes a first resistor coupled to the fifth node and to a bias voltage source and a second resistor coupled to the sixth node and to the bias voltage source. The first and second resistors are for coupling the bias voltage source to the fifth and sixth nodes, respectively.

Additionally, this embodiment includes a third switching means coupled to the fifth node and to the bias voltage source and a fourth switching means coupled to the sixth node and to the bias voltage source. The third and fourth switching means are for selectively coupling the fifth node and sixth node, respectively, to the voltage source. This embodiment also includes a first control means coupled to the first and second switching means for controlling the first and second switching means and a second control means coupled to the third and fourth switching means for controlling the third and fourth switching means. The first, second, third, and fourth switching means are preferably metal oxide semiconductor (MOS) devices.

Figure 6:
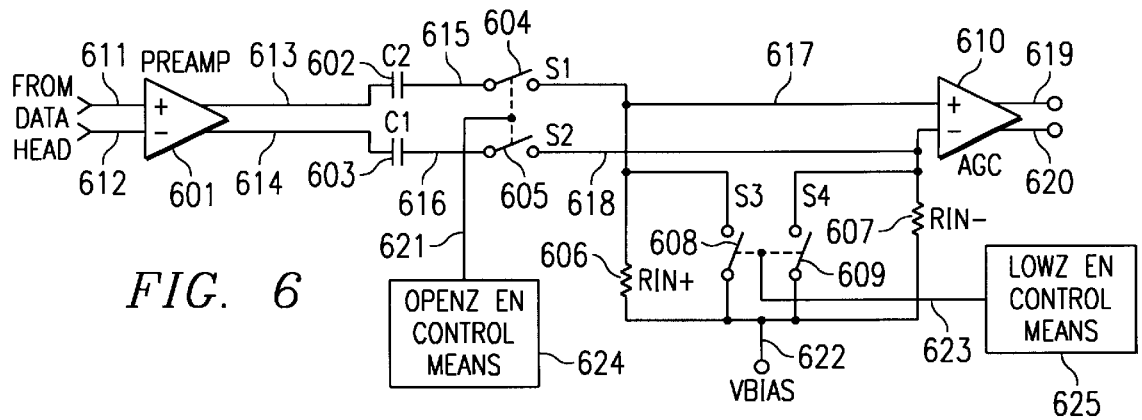
FIG. 6 is a schematic diagram illustrating a read channel input circuit according to the present invention.
Figure 5:
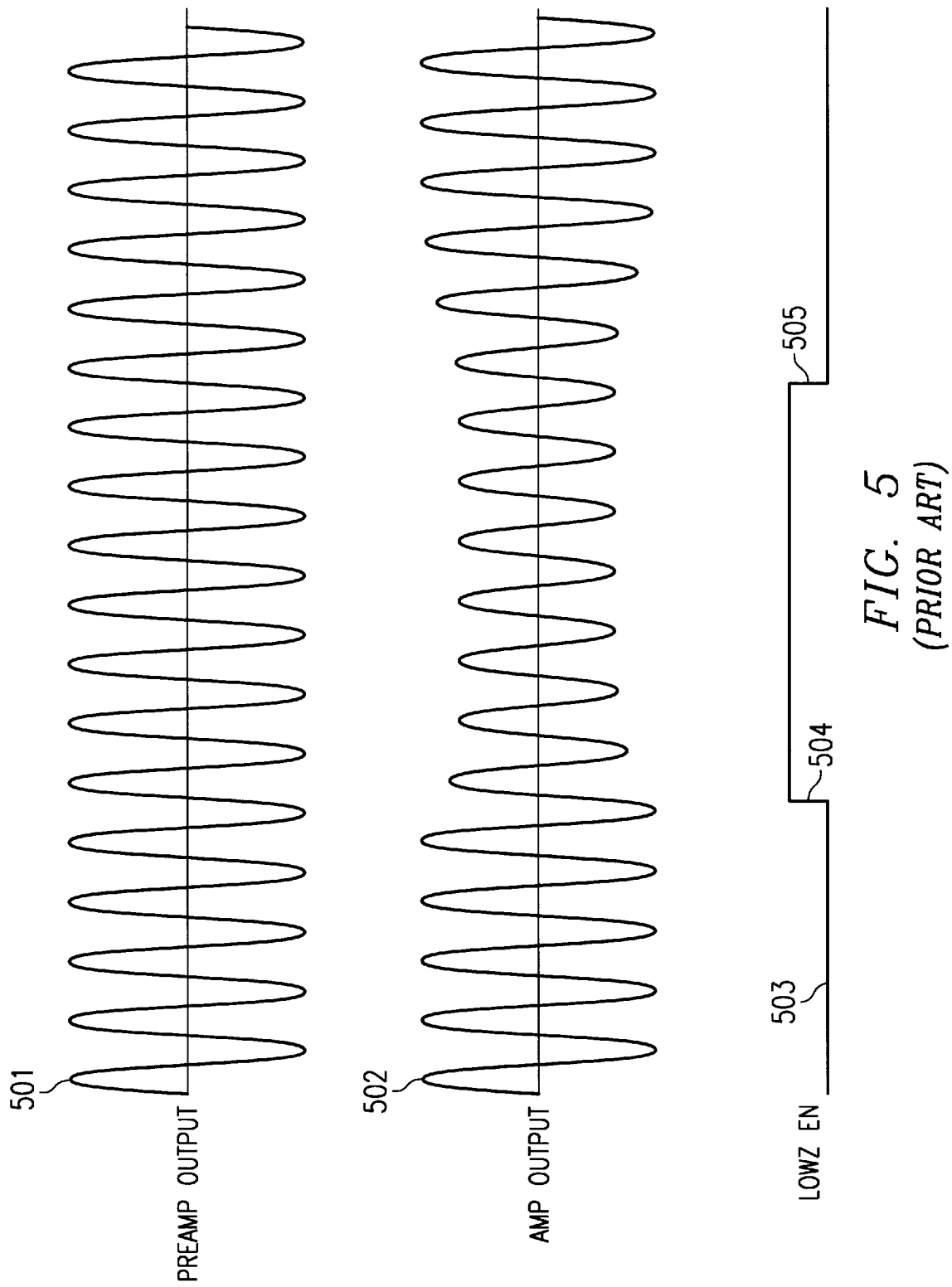
FIG. 5 is a diagram illustrating waveforms resulting from the operation of the read channel input circuit illustrated in FIG. 2.

FIG. 6 is a schematic diagram illustrating a read channel input circuit according to the present invention. A signal from a data head is applied across inputs 611 and 612 of preamplifier circuit 601. Preamplifier circuit 601 amplifies the signal and provides an output signal across outputs 613 and 614. Output 613 is coupled to a first terminal of capacitor 602, and output 614 is coupled to a first terminal of capacitor 603. A second terminal of capacitor 602 is coupled to a first terminal of switch 604 at node 615. A second terminal of capacitor 603 is coupled to a first terminal of switch 605 at node 616.

A second terminal of switch 604 is coupled to a first terminal of resistor 606, to a first terminal of switch 608, and to a non-inverting input of AGC amplifier circuit 610. A second terminal of switch 605 is coupled to a first terminal of resistor 607, to a first terminal of switch 609, and to an inverting input of AGC amplifier circuit 610. A second terminal of each of resistors 606 and 607 and switches 608 and 609 is coupled to bias voltage source Vbias at node 622. LowZ En control means 625 provides control signal LowZ En at node 623, LowZ En control means 625 is coupled to node 623 and to switches 608 and 609 and controls the operation of switches 608 and 609. OpenZ En control means 624 provides control signal OpenZ En at node 621. OpenZ En control means 624 is coupled to node 621 and to switches 604 and 605 and controls the operation of switches 604 and 605. AGC amplifier circuit 610 provides an output signal across outputs 619 and 620. LowZ En control means 625 and OpenZ En control means 624 are preferably implemented with digital logic circuits or a microcontroller that produces the appropriate control signals at the appropriate times based on the mode of operation of the storage device. LowZ En control means 625 and OpenZ En control means 624 may be combined into a single digital logic circuit or microcontroller that provides the appropriate control signals.

Figure 9:
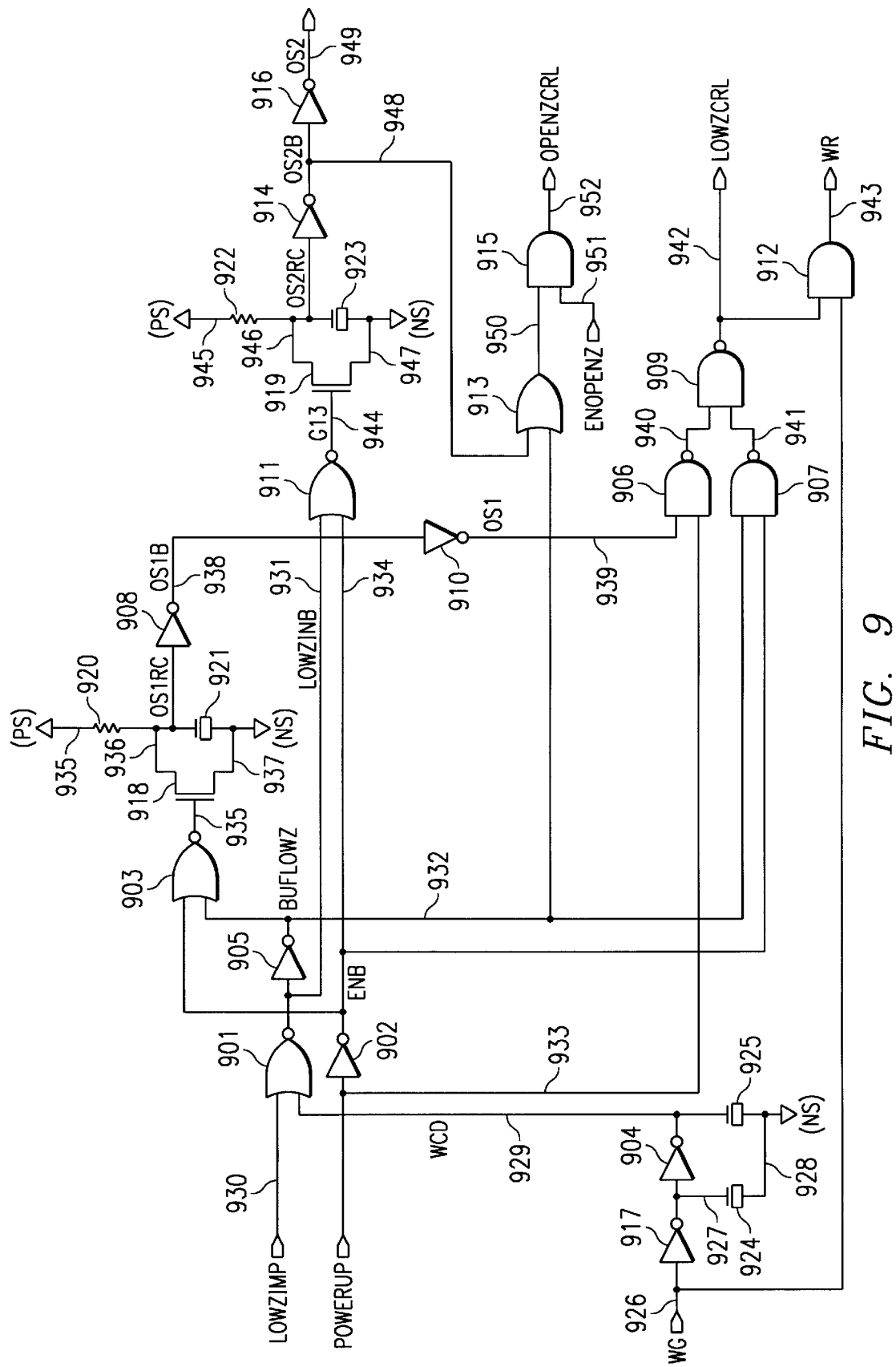
FIG. 9 is a schematic diagram illustrating one embodiment of LowZ En control means 625 and OpenZ En control means 624.

FIG. 9 is a schematic diagram illustrating one embodiment of LowZ En control means 625 and OpenZ En control means 624. Input WG at node 926 is coupled to the input of inverter 917 and to an input of AND gate 912. The output of inverter 917 is coupled to a first terminal of capacitor 924 and to the input of inverter 904 at node 927. The output of inverter 904 provides the signal WGD at node 929 and is coupled to a first terminal of capacitor 925 and to an input of NOR gate 901. A second terminal of capacitor 924 and a second terminal of capacitor 925 are coupled to a negative supply voltage NS at node 928.

Input LOWZTMP at node 930 is coupled to an input of NOR gate 901. The output of NOR gate 901 provides the signal LOWZINB at node 931 and is coupled to the input of inverter 905 and to an input of NOR gate 911. The output of inverter 905 provides the signal BUFLOWZ at node 932 and is coupled to an input of NOR gate 903, an input of OR gate 913, and an input of NAND gate 907. Input POWERUP at node 933 is coupled to the input of inverter 902 and to an input of NAND gate 906. The output of inverter 902 provides signal ENB at node 934 and is coupled to an input of NOR gate 903, an input of NOR gate 911, and an input of NAND gate 907.

The output of NOR gate 903 is coupled to the gate terminal of MOSFET 918 at node 935. Positive supply voltage PS is coupled to a first terminal of resistor 920 at node 935. A second terminal of resistor 920 is coupled to the drain terminal of MOSFET 918, a first terminal of capacitor 921, and the input of inverter 908 at node 936, where signal OSLRC is present. A second terminal of capacitor 921 is coupled to the source terminal of MOSFET 918 and negative supply voltage NS at node 937. Note that the source and drain terminals of a MOSFET are generally not critical and may be used interchangeably. The output of inverter 908 provides signal OS1B at node 938 and is coupled to the input of inverter 910. The output of inverter 910 provides signal OS1 at node 939 and is coupled to an input of NAND gate 906.

The output of NAND gate 906 is coupled to an input of NAND gate 909 at node 940. The output of NAND gate 907 is coupled to an input of NAND gate 909 at node 941. The output of NAND gate 909 is coupled to an input of AND gate 912 and output LOWZCRL at node 942. The output of AND gate 912 is coupled to output WR at node 943.

The output of NOR gate 911 provides signal G13 at node 944 and is coupled to a gate terminal of MOSFET 919. Positive supply voltage PS at node 945 is coupled to a first terminal of resistor 922. A second terminal of resistor 922 is coupled a drain terminal of MOSFET 919, a first terminal of capacitor 923, and an input of inverter 914 at node 946, where signal OS2RC is present. A second terminal of capacitor 923 is coupled to a source terminal of MOSFET 919 and to negative supply voltage NS at node 947. The output of inverter 914 provides signal OS2B at node 948 and is coupled to the input of inverter 916 and to an input of OR gate 913. The output of inverter 916 provides signal OS2 at node 949. The output of OR gate 913 is coupled to an input of AND gate 915 at node 950. Input ENOPENZ at node 951 is coupled to an input of AND gate 915. The output of AND gate 915 is coupled to output OPENZCRL at node 952.

Signal LOWZTMP at node 930 is provided to control the timing and sequencing of the operation of the LowZ and OpenZ switches for muting transient noise in the read channel. Signal WG is provided at node 926 for alternate control when a signal representing a write gate mode is available. A change in the signal WG is inverted by inverter 917. Since it takes time to change the charge on capacitor 924 in response to the change in signal WG, inverter 904 does not change state until the delay has occurred. Likewise, additional time is required to change the charge on capacitor 925. Thus, signal WGD at node 929 does not change state until the additional delay has also elapsed. NOR gate 901 asserts its output, signal LOWZINB, which is active low, when either of signals LOWZTMP or WGD is asserted. Signal LOWZINB at node 931 is provided to an input of NOR gate 911 and is inverted by inverter 905 to provide signal BUFLOWZ at node 932. Signal BUFLOWZ is provided to inputs of NOR gate 903, OR gate 913, and NAND gate 907.

Signal POWERUP is provided at node 933, provided to an input of NAND gate 906, and inverted by inverter 902 to provide signal ENB at node 934. Signal ENB is provided to inputs of NOR gate 903, NOR gate 911, and NAND gate 907. NOR gate 903 provides an output signal at node 935 that drives the gate of MOSFET 918. When driven into conduction, MOSFET 918 rapidly discharges capacitor 921, causing the signal OSLRC at node 936 to drop to a low logic level. When MOSFET 918 is turned off, pullup resistor 920 gradually restores charge to capacitor 921, causing signal OSLRC at node 936 to rise to a high logic level after a delay based on the RC time constant of resistor 920 and capacitor 921. After this delay, inverter 908 changes state, causing signal OS1B at node 938, inverter 910, and signal OS1 at node 939 to change state. Signal OS1 at node 939 is provided to an input of NAND gate 906.

NAND gates 906, 907, and 909 are configured to provide signal LOWZCRL at node 942 such that signal LOWZCRL has a high logic level when both of the inputs of either or both of NAND gates 906 and 907 have high logic levels. When both NAND gates 906 and 907 have at least one of their input lines at a low logic level, signal LOWZCRL has a low logic level. Signal LOWZCRL may be applied at node 623 to control switches 608 and 609 or at node 866. AND gate 912 provides as signal WR at node 943 the logical AND of signal LOWZCRL at node 942 and signal WG at node 926.

NOR gate 911 provides signal G13 at node 944 to drive the gate of MOSFET 919. When driven into conduction, MOSFET 919 rapidly discharges capacitor 923, causing the signal OS2RC at node 946 to drop to a low logic level. When MOSFET 919 is turned off, pullup resistor 922 gradually restores charge to capacitor 923, causing signal OS2RC at node 946 to rise to a high logic level after a delay based on the RC time constant of resistor 922 and capacitor 923. After this delay, inverter 914 changes state, causing signal OS2B at node 948, inverter 916, and signal OS2 at node 949 to change state. Signal OS2B at node 948 is provided to an input of OR gate 913. OR gate 913 provides an output at node 950 to an input of AND gate 915. AND gate 915 produces signal OPENZCRL at node 952 from the logical AND of signal ENOPENZ at node 951 and the output of OR gate 913 at node 950. Signal OPENZCRL at node 952 may be applied at node 621 to control switches 604 and 605 or at node 860.

Figure 10:
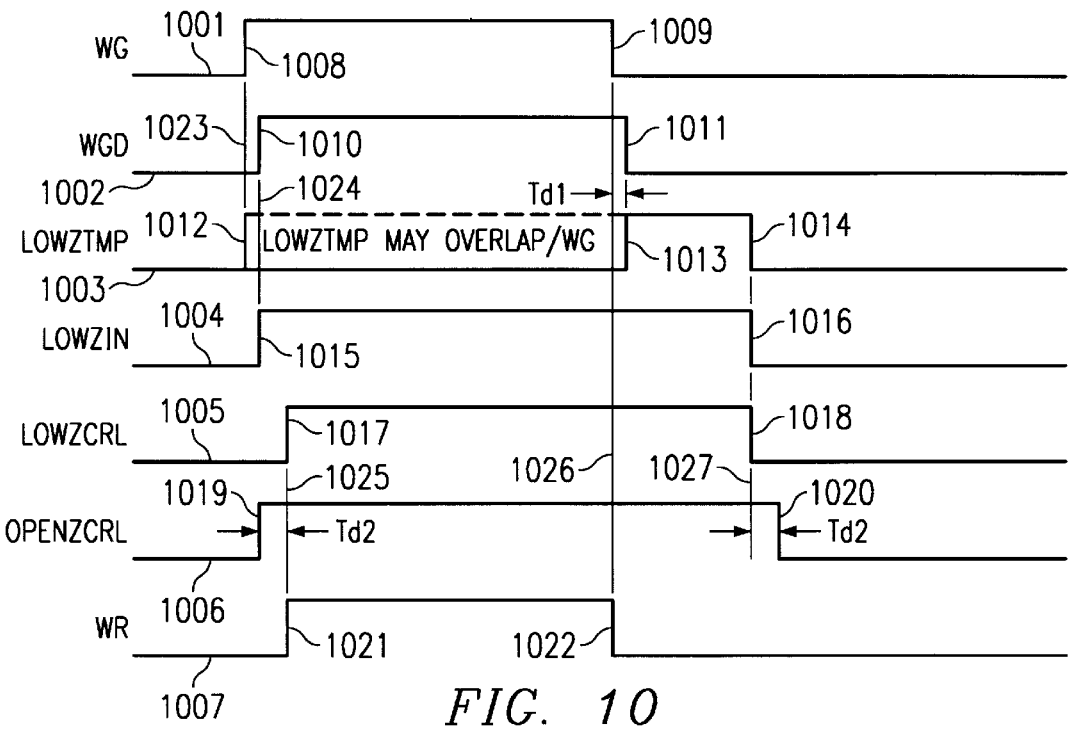
FIG. 10 is a timing diagram illustrating signals of one embodiment of LowZ En control means 625 and OpenZ En control means 624 when signal WG exhibits activity.

FIG. 10 is a timing diagram illustrating signals of one embodiment of LowZ En control means 625 and OpenZ En control means 624 when signal WG exhibits activity. Signal WG, which is illustrated as waveform 1001, is present at a write gate input to the control means. Signal WGD, which is illustrated as waveform 1002, is based on signal WG, but is delayed in time relative to signal WG. Inverters 917 and 904, along with capacitors 927 and 925 introduce the delay between signal WG and signal WGD. Signal LOWZTMP, which is illustrated as waveform 1003, is an input to the control means used to control the operation and sequencing of the LowZ and OpenZ switches. Signal LOWZIN is based on the logical OR of the WGD and LOWZTMP signals and is illustrated as waveform 1004. Signal LOWZCRL is illustrated as waveform 1005 and is provided as an output of the control means to control the operation of the LowZ switches. Signal OPENZCRL is illustrates as waveform 1006 and is provided as an output of the control means to control the operation of the OpenZ switches. Signal WR, which is illustrated as waveform 1007, is provided as an output of the control means and is based on the logical AND of signal WG and signal LOWZCRL.

Signal WG is asserted at transition 1008. Instant 1023 represents the point in time at which transition 1008 occurs. Since signal WGD is based on signal WG, but delayed in time, signal WGD is asserted at transition 1010, following instant 1023 by a delay of duration Td1. Duration Td1 is preferably in the range of 0–50 nanoseconds, but may be selected to optimize circuit performance based on the characteristics of the preamplifier circuit. Since signal LOWZIN is based on the logical OR of signals WGD and LOWZTMP, signal LOWZIN is asserted at transition 1015, which occurs substantially simultaneously with transition 1010. Signal OPENZCRL is asserted at transition 1019, which occurs substantially simultaneously with transition 1010.

Signal LOWZCRL is asserted at transition 1017, which follows the assertion of signal OPENZCRL at transition by a delay of duration Td2. NOR gate 903, MOSFET 918, resistor 920, capacitor 921, and inverters 908 and 910 work together to provide this delay. Duration Td2 is preferably in the range of 15–50 nanoseconds. Instant 1025 represents the point in time at which transition 1017 occurs. Since signal WG has been asserted and signal LOWZCRL is asserted at transition 1017, signal WR, which is the logical AND of signals WG and LOWZCRL, is asserted at transition 1021, which occurs substantially simultaneously with transition 1017.

Signal WG remains asserted until transition 1009, when it is deasserted. Since signal WR is the logical AND of signals WG and LOWZCRL, it is deasserted at transition 1022, which is substantially simultaneous with transition 1009. Instant 1026 represents the moment in time at which transition 1009 occurs. Since signal WGD lags behind signal WG by a delay of duration Td1, signal WGD is deasserted at transition 1011, which occurs a time Td1 after instant 1026.

Signal LOWZTMP at transition 1012, which is substantially simultaneous with transition 1008, at transition 1013, which is substantially simultaneous with transition 1011, or at any point in time that lies between transition 1012 and transition 1013. Thus, signal LOWZTMP may be asserted during some portion or all of the period of time over which signal WG is asserted. Note that instant 1024, which represents the point in time at which transition 1010 occurs, lies between transitions 1012 and 1013 in time. Signal LOWZTMP is deasserted at transition 1014. Signal LOWZIN, which is based on the logical OR of signals WGD and LOWZTMP, is deasserted at transition 1016, which is substantially simultaneous with transition 1014. Signal LOWZCRL is deasserted at transition 1018, which is also substantially simultaneous with transition 1014. Instant 1027 represents the point in time at which transition 1014 occurs. Signal OPENZCRL is deasserted at transition 1020, which occurs a delay of duration Td2 after instant 1027. NOR gate 911, MOSFET 919, resistor 922, capacitor 923, and inverter 914 work together to provide this delay.

Figure 11:
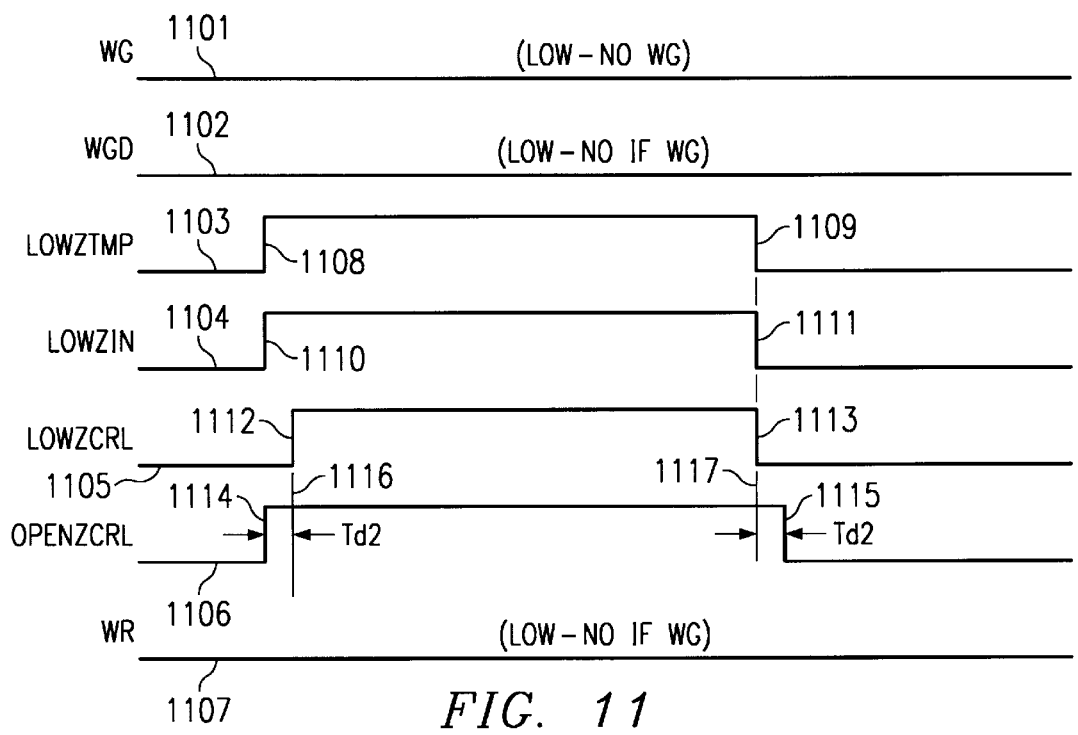
FIG. 11 is a timing diagram illustrating signals of one embodiment of LowZ En control means 625 and OpenZ En control means 624 when signal WG remains inactive.

FIG. 11 is a timing diagram illustrating signals of one embodiment of LowZ En control means 625 and OpenZ En control means 624 when signal WG remains inactive. Signal WG, which is illustrated as waveform 1101, is present at a write gate input to the control means. Signal WGD, which is illustrated as waveform 1102, is based on signal WG, but is delayed in time relative to signal WG. Since signal WG remains inactive in this diagram, waveforms WG and WGD reflect this inactivity. Signal LOWZTMP, which is illustrated as waveform 1103, is an input to the control means used to control the operation and sequencing of the LowZ and OpenZ switches. Signal LOWZIN is based on the logical OR of the WGD and LOWZTMP signals and is illustrated as waveform 1104. Signal LOWZCRL is illustrated as waveform 1105 and is provided as an output of the control means to control the operation of the LowZ switches. Signal OPENZCRL is illustrated as waveform 1106 and is provided as an output of the control means to control the operation of the OpenZ switches. Signal WR, which is illustrated as waveform 1107, is provided as an output of the control means and is based on the logical AND of signal WG and signal LOWZCRL. Since signal WG remains inactive in this diagram, signal WR also remains inactive in this diagram.

Signal LOWZTMP is asserted at transition 1108. Signal LOWZIN, which is based on the logical OR of the WGD and LOWZTMP signals, is asserted at transition 1110, which is substantially simultaneous with transition 1108. Signal OPENZCRL is asserted at transition 1114, which is also substantially simultaneous with transition 1108. Signal LOWZCRL is asserted a delay of duration Td2 after transition 1114. Instant 1116 represents the point in time at which transition 1112 occurs.

Signal LOWZTMP is deasserted at transition 1109. Since signal LOWZIN is based on the logical OR of the WGD and LOWZTMP signals, signal LOWZIN is deasserted at transition 1111, which is substantially simultaneous with transition 1109. Signal LOWZCRL is deasserted at transition 1113, which is substantially simultaneous with transition 1109. Instant 1117 represents the point in time at which transition 1113 occurs. Signal OPENZCRL is deasserted at transition 1115, which occurs a delay of duration Td2 after instant 1117.

Figure 7:
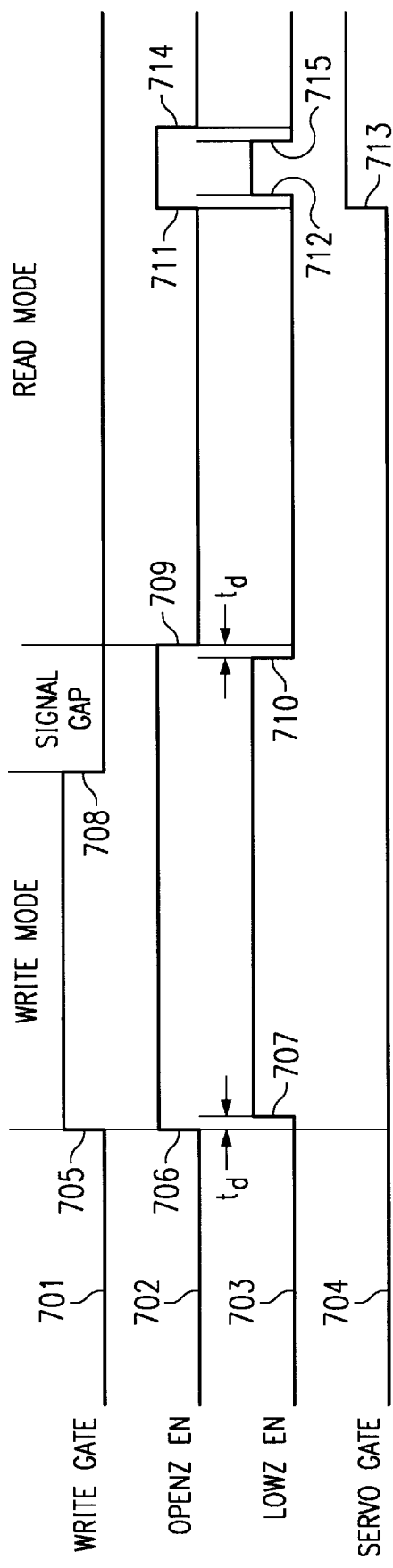
FIG. 7 is a timing diagram illustrating operation of the read channel input circuit of FIG. 6.
Figure 7:
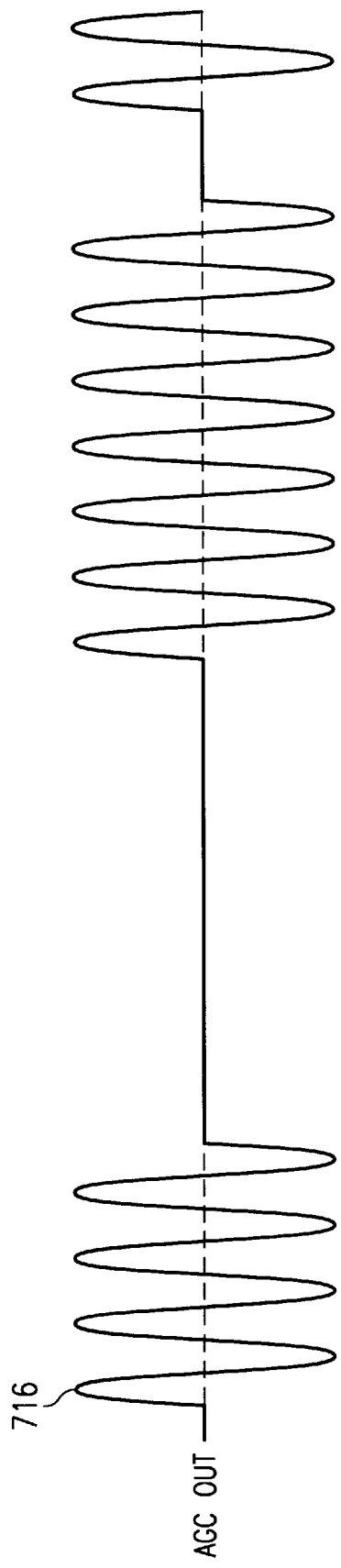

FIG. 7 is a timing diagram illustrating operation of the read channel input circuit of FIG. 6. A storage medium, such as a disk drive, typically has two primary modes of operation. These modes are a read mode and a write mode. A signal gap usually exists between the read mode and the write mode during which no coherent signal is expected. During the write mode, it is desirable to suppress the signal from preamplifier circuit 601 present at nodes 617 and 618. However, when the read mode occurs and coherent data is present at nodes 617 and 618, it is desirable to restore the proper bias levels at nodes 617 and 618 and to allow the signal from preamplifier circuit 601 to pass to AGC amplifier circuit 610 so that the incoming data may be recovered. A Write Gate signal is illustrated as waveform 701. An OpenZ En signal is illustrated as waveform 702. A LowZ En signal is illustrated as waveform 703. A Servo Gate signal is illustrated as waveform 704. An AGC Out signal is illustrated as waveform 716.

In FIG. 7, the Write Gate, OpenZ En, LowZ En, and Servo Gate signals are all shown initially in their inactive states. An unattenuated AGC Out signal is present during this time. The Write Gate signal is asserted at transition 705 as the storage device enters the write mode. As closely as practical in time to the assertion of the Write Gate signal, preferably simultaneously, the OpenZ En signal is asserted at transition 706. After a delay of time $t_d$, which is preferably in the range of 15–50 nanoseconds, beyond the time at which the OpenZ En signal is asserted, the LowZ En signal is asserted at transition 707. At this time, the amplitude of the AGC Out signal is reduced to practically zero.

When the write mode is completed, the Write Gate signal returns to its inactive state at transition 708. Following the write mode and preceding the read mode, a signal gap occurs. At the end of the signal gap or shortly thereafter, the LowZ En signal is deasserted at transition 710. After a delay of time $t_d$, which is preferably in the range of 15–50 nanoseconds, the OpenZ En signal is deasserted at transition 709. At this time, the amplitude of the AGC Out signal is restored to its unattenuated level, allowing the read data to be readily recovered during the read mode.

At transition 713, the Servo Gate signal is asserted, and a servo mode is entered. As close in time to transition 713 as practical, preferably simultaneously, the OpenZ En signal is asserted at transition 711. After a delay of time $t_d$ beyond the time at which the OpenZ En signal is asserted, the LowZ En signal is asserted at transition 712. At this time, the amplitude of the AGC Out signal is reduced to practically zero. At transition 715, the LowZ En signal returns to its inactive state. At a time $t_d$ after transition 715, the OpenZ En signal returns to its inactive state at transition 714. At this time, the amplitude of the AGC Out signal is restored to its unattenuated level.

The present invention provides for sequencing of the OpenZ En signal and the LowZ En signal. To mute the signal derived from the data head, first the OpenZ En signal is asserted, causing switches 604 and 605 to open, effectively disconnecting the inputs of AGC amplifier circuit 610 at nodes 617 and 618 from the capacitively-coupled outputs of preamplifier circuit 601 at nodes 615 and 616. By providing such a disconnection, switches 604 and 605 eliminate "sample and hold" effects by preventing spurious signals present at capacitors 602 and 603 from persisting and degrading circuit performance upon operation of switches 608 and 609. After switches 604 and 605 are opened, any transient phenomena that might result from the opening of switches 604 and 605 is allowed to subside over a time delay td, then the LowZ En signal is asserted, causing switches 608 and 609 to close, attenuating any high frequency signals or other spurious signals that may be present at nodes 617 and 618. Use of switches 608 and 609 allows less stringent requirements for the characteristics of switches 604 and 605, since switches 608 and 609 attenuate any leakage of signals through switches 604 and 605 that may result from device parasitics in switches 604 and 605.

While switches 604 and 605 are open and switches 608 and 609 are closed, even if a disturbance having a magnitude ΔV occurs at node 613 and is coupled to node 615, switch 604 prevents the disturbance being coupled to node 617. Likewise, switch 605 prevents a disturbance at node 616 from being coupled to node 618. Thus, since switches 608 and 609 provide a low impedance path to Vbias for nodes 617 and 618, nodes 617 and 618 remain at a voltage substantially equal to Vbias while switches 604 and 605 are open and switches 608 and 609 are closed regardless of any noise that may be present at nodes 615 and 616.

When the signals from the data head are to be unmuted, the LowZ En signal is first deasserted, causing switches 608 and 609 to open and increasing the impedance of the bias stage comprising resistors 606 and 607 and switches 608 and 609. By keeping switches 604 and 605 open until after switches 608 and 609 are opened, any spurious signals that may be present at nodes 615 and 616 are prevented from propagating to nodes 617 and 618, and "sample and hold" effects are avoided when switches 608 and 609 are opened. After a time delay $t_d$, which is sufficient to allow any transient phenomena related to the opening of switches 608 and 609 to subside, has elapsed, signal OpenZ En is deasserted, causing switches 604 and 605 to close and completing the path for signals from the data head to pass through preamplifier circuit 601, capacitors 602 and 603, and AGC amplifier circuit 610.

Since switches 604 and 605 effectively disconnect the bias network comprising resistors 606 and 607 from nodes 615 and 616, excursions of the input signal at nodes 611 and 612 captured by AC-coupling capacitors 602 and 603 do not disturb the amplifier bias conditions. Thus, the time period usually required to discharge excess capacitor voltage resulting from input voltage excursions is avoided so that the AGC amplifier bias conditions can be restored quickly, providing more timely recovery of disk read data.

Switches 604 and 605 in combination with switches 608 and 609 provide complete suppression of input signals so that high frequency transients are not propagated through the read channel. By blocking such transients, the present invention prevents the saturation of succeeding amplifier stages or other undesirable transient effects which could require additional recovery time before data could be accurately recovered.

As disk drive densities and transfer rates continue to increase, requirements for fast recovery of data after operating mode changes become more stringent. The present invention reduces the amount of time required to recover from write-to-read or servo mode transitions, reducing overhead time and allowing more time to be allocated for reading valid data. By decreasing recovery time, the present invention allows higher data densities to be realized, resulting in improved disk drive performance.

The present invention also allows multiple modes of operation, including adaptive modes. For example, during initial application of power to the read channel (referred to as powerup), it is desirable to charge capacitors 602 and 603 up to their normal operating voltages rapidly. To achieve such rapid charging, in one embodiment of the present invention, LowZ En control means 625 asserts signal LowZ En at node 623, causing switches 608 and 609 to close. With switches 608 and 609 closed, a low impedance coupling is provided between nodes 617 and 618 and bias voltage source Vbias at node 622. OpenZ En control means 624 deasserts signal OpenZ En at node 621 to keep switches 604 and 605 closed. With switches 604 and 605 closed, the low impedance coupling of nodes 617 and 618 to bias voltage source Vbias at node 622 is extended to capacitors 602 and 603 at nodes 615 and 616, respectively. The low impedance path from bias voltage source Vbias to capacitors 602 and 603 allows capacitors 602 and 603 to be charged rapidly to their normal operating voltage.

As another example, in one embodiment of the present invention, if transient voltage excursions at the inputs to AC coupling capacitors 602 and 603 are expected to be so large that they would forward bias switches 604 and 605, allowing the capacitors to become charged by the large transient voltage excursions and preventing switches 604 and 605 from being fully opened during the channel mode change, LowZ En control means 625 asserts signal LowZ En at node 623 to close switches 608 and 609, while leaving switches 604 and 605 closed, rapidly resetting the voltages across capacitors 602 and 603.

Switches 604 and 605 ideally provide infinite resistance when opened. However, typically a small leakage current flows through switches 604 and 605 even when they are open. If switches 608 and 609 remain open and switches 604 and 605 are opened and kept open long enough to allow capacitors 602 and 603 to discharge such that the voltages across capacitors 602 and 603 drift significantly, one embodiment of the present invention closes switches 608 and 609 to restore the appropriate voltages across capacitors 602 and 603 while leaving switches 604 and 605 closed or after switches 604 and 605 have been closed after having been opened during a channel mode change.

The present invention also provides an adaptive capability to allow deasserting signal LowZ En at node 623 when its assertion would not be beneficial. For example, if the common mode input bias current of AGC amplifier 610 is large in certain operating gain regions of the amplifier, it may be desirable to control switches 608 and 609 so as to minimize the common mode input bias current. One embodiment of the present invention inhibits signal LowZ En at node 623 to keep switches 608 and 609 open, limiting the input bias current flow through switches 608 and 609 so that common mode voltage shifts at the inputs of AGC amplifier 610 are minimized, as compared with the situation where switches 608 and 609 are transitioning between closed (asserted) and open (deasserted) states. Thus, the adaptive capability of the present invention provides another example of superior performance of the present invention as compared with the prior art.

Figure 8:
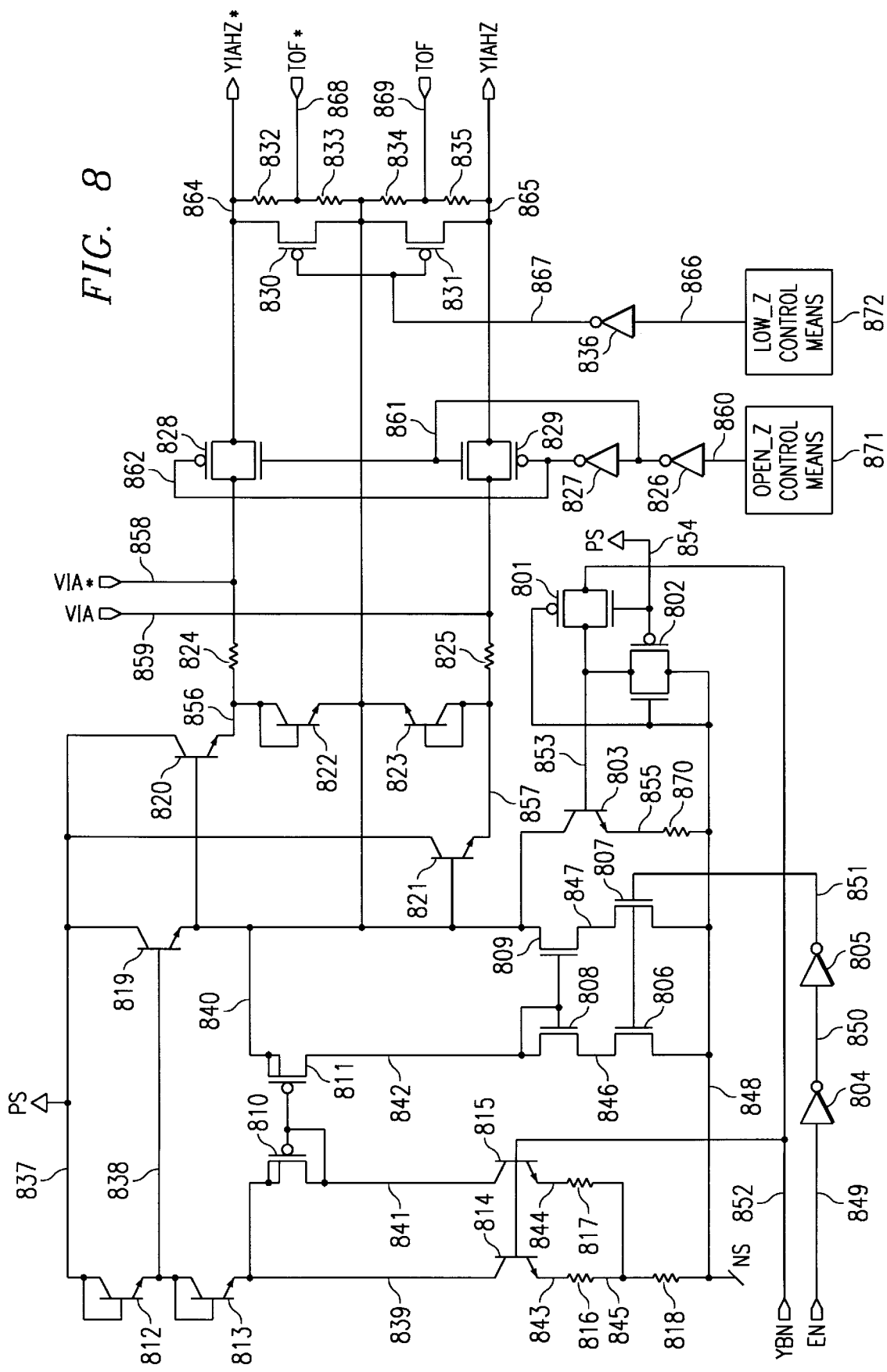
FIG. 8 is a schematic diagram illustrating one embodiment of the present invention.

FIG. 8 is a schematic diagram illustrating one embodiment of the present invention. Positive supply voltage source PS at node 837 is coupled to the collector of NPN transistor 812, to the base of NPN transistor 812, to the collector of NPN transistor 819, to the collector of NPN transistor 820, and to the collector of NPN transistor 821. The emitter of NPN transistor 812 is coupled to the base of NPN transistor 819, to the collector of NPN transistor 813, and to the base of NPN transistor 813 at node 838. The emitter of NPN transistor 813 is coupled to the collector of NPN transistor 814 and to the source of p-channel field effect transistor (FET) 810 at node 839. The emitter of NPN transistor 814 is coupled to the first terminal of resistor 816 at node 843. The gate of p-channel FET 810 is coupled to the gate of p-channel FET 811, to the drain of p-channel FET 810, and to the collector of NPN transistor 815 at node 841. The emitter of NPN transistor 815 is coupled to the first terminal of resistor 817 at node 844. The second terminal of resistor 816 and the second terminal of resistor 817 are coupled to the first terminal of resistor 818 at node 845. The second terminal of resistor 818 is coupled to negative supply voltage source NS at node 848.

Bias voltage Vbn at node 852 is coupled to the base of NPN transistor 814, to the base of NPN transistor 815, and to a first terminal of CMOS switch 801. A second terminal of CMOS switch 801 is coupled to the base of NPN transistor 803 and to a first terminal of CMOS switch 802 at node 853. A second terminal of CMOS switch 802 is coupled to negative supply voltage source NS at node 848. The n-channel gate terminal of CMOS switch 801 and the p-channel gate terminal of CMOS switch 802 are coupled to positive supply voltage source PS at node 854. The p-channel gate terminal of CMOS switch 801 and the n-channel gate terminal of CMOS switch 802 are coupled to negative supply voltage source NS at node 848. The emitter of NPN transistor 803 is coupled to the first terminal of resistor 870 at node 855. The second terminal of resistor 870 is coupled to negative supply voltage source NS at node 848.

Enable input EN at node 849 is coupled to the input of inverter 804. The output of inverter 804 is coupled to the input of inverter 805 at node 850. The output of inverter 805 is coupled to the gate terminal of n-channel metal oxide semiconductor field effect transistor (MOSFET) 806 and to the gate terminal of n-channel MOSFET 807 at node 851. The drain of p-channel FET 811 is coupled to the drain of n-channel MOSFET 808, to the gate of n-channel MOSFET 808, and to the gate of n-channel MOSFET 809 at node 842. The source of n-channel MOSFET 808 is coupled to the drain of n-channel MOSFET 806 at node 846. The source of n-channel MOSFET 809 is coupled to the drain of n-channel MOSFET 807 at node 847. The source of n-channel MOSFET 806 is coupled to negative supply voltage source NS at node 848. The source of n-channel MOSFET 807 is coupled to negative supply voltage source NS at node 848.

The emitter of NPN transistor 820 is coupled to the collector of NPN transistor 822, to the base of NPN transistor 822, and to the first terminal of resistor 824 at node 856. The emitter of NPN transistor 821 is coupled to the collector of NPN transistor 823, to the base of NPN transistor 823, and to the first terminal of resistor 825 at node 857. Input VIA* is coupled to the second terminal of resistor 824 and to the first terminal of CMOS switch 828 at node 858. Input VIA is coupled to the second terminal of resistor 825 and to the first terminal of CMOS switch 829 at node 859. OPEN_Z control means 871 provides a signal at input OPEN_Z at node 860. Input OPEN_Z at node 860 is coupled to the input of inverter 826. The output of inverter 826 is coupled to the input of inverter 827, to the n-channel gate terminal of CMOS switch 828, and to the n-channel gate terminal of CMOS switch 829 at node 861. The output of inverter 827 is coupled to the p-channel gate terminal of CMOS switch 828 and to the p-channel gate terminal of CMOS switch 829 at node 862.

The second terminal of CMOS switch 828 is coupled to the source of p-channel MOSFET 830, to the first terminal of resistor 832, and to output VIAHZ* at node 864. The second terminal of CMOS switch 829 is coupled to the source of p-channel MOSFET 831, to the first terminal of resistor 835, and to output VIAHZ at node 865. LOW_Z control means 872 provides a signal at input LOW_Z at node 866. Input LOW_Z at node 866 is coupled to the input of inverter 836. The output of inverter 836 is coupled to the gate terminal of p-channel MOSFET 830 and to the gate terminal of p-channel MOSFET 831 at node 867. Input TOF* at node 868 is coupled to the second terminal of resistor 832 and to the first terminal of resistor 833. Input TOF at node 869 is coupled to the second terminal of resistor 835 and to the first terminal of resistor 834. The emitter of NPN transistor 819 is coupled to the source of p-channel FET 811, to the base of NPN transistor 820, to the base of NPN transistor 821, to the drain of n-channel MOSFET 809, to the collector of NPN transistor 803, to the emitter of NPN transistor 822, to the emitter of NPN transistor 823, to the drain of p-channel MOSFET 830, to the drain of p-channel MOSFET 831, to the second terminal of resistor 833, and to the second terminal of resistor 834 at node 840.

Signals derived from a storage medium by a data head are preamplified and capacitively coupled to inputs VIA and VIA* at nodes 859 and 858, respectively. By capacitively coupling the inputs, the AC signals from the data head are coupled while avoiding interference from any DC voltages that may be present. Outputs VIAHZ and VIAHZ* at nodes 865 and 864, respectively, are coupled to inputs of an AGC amplifier of the read channel circuit. The OPEN_Z input at node 860 receives a signal that controls the OPEN_Z switches. The signal at node 860 is logically inverted by inverter 826, and the inverted signal is output at node 861. This inverted signal is then inverted again by inverter 827, with the output of inverter 827 provided at node 862. CMOS switches 828 and 829, which are also referred to as transmission gates, comprise a PMOS device and an NMOS device in parallel with the source terminal of the PMOS device coupled to one of the source or drain terminals of the NMOS device and the drain terminal of the PMOS device coupled to the other of the source or drain terminals of the NMOS device. CMOS switch 828 couples signals from node 858 to node 864 and CMOS switch 829 couples signals from node 859 to node 865 when the OPEN_Z input at node 860 has a low logic level. CMOS switches 828 and 829 prevent the coupling of the same signals when the OPEN_Z input at node 860 has a high logic level.

P-channel MOSFET 830 is coupled such that the path between its source and drain terminals is in parallel with the series combination of resistors 832 and 833. P-channel MOSFET 831 is coupled such that the path between its source and drain terminals is in parallel with the series combination of resistors 834 and 835. P-channel MOSFET 830 couples node 864 to node 840, bypassing resistors 832 and 833, when the LOW_Z input at node 866 is asserted at a high logic level. P-channel MOSFET 831 coupled node 865 to node 840, bypassing resistors 834 and 835, when the LOW_Z input at node 866 is asserted at a high logic level. When the LOW_Z input at node 866 has a low logic level, p-channel MOSFETs 830 and 831 are turned off and do not provide a path for current to bypass the resistors.

Bias voltage VBIAS at node 840 can be turned off by deasserting the EN input at node 849, providing a power saving capability. When deasserted, the EN input has a low logic level. The low logic level is inverted by inverter 804, then inverted again by inverter 805. Since the EN input is inverted twice, the output of inverter 805 has the same polarity as the original signal at the EN input. Thus, inverters 804 and 805 may be alternatively implemented as a non-inverting buffer. When the signal at node 851 has a low logic level, n-channel MOSFET transistors 806 and 807 are turned off, disabling the circuit that provides bias voltage $V_{BIAS}$ at node 840.

NPN transistors 820, 821, 822, and 823 provide a signal clamping capability for the signals present at nodes 858 and 859. Resistors 824 and 825 limit the current through transistors 820, 821, 822, and 823 to protect the transistors in case of accidental shorting.

OPEN_Z control means 871 and LOW_Z control means 872 are preferably implemented with digital logic circuits or a microcontroller that provides the appropriate signals at the appropriate times based on the mode of operation of the storage device. OPEN_Z control means 871 and LOW_Z control means 872 may be combined into a single logic circuit or microcontroller that provides the appropriate control signals.

Figure 12:
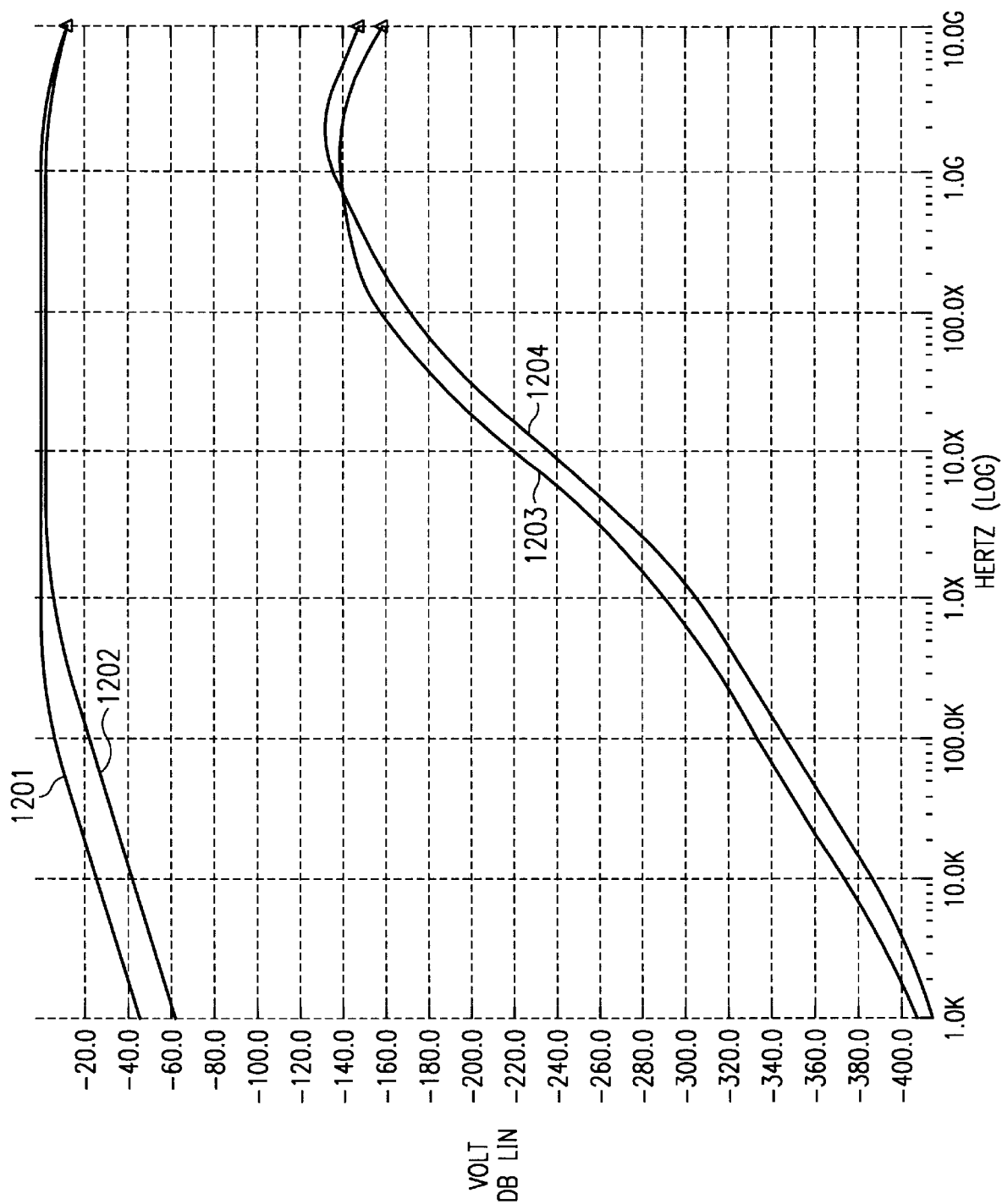
FIG. 12 is a graph illustrating attenuation of undesired signals.

FIG. 12 is a graph illustrating attenuation of undesired signals. The graph results from simulation of circuit performance generated using common circuit analysis software. Data represented by the graph are typical. The vertical axis represents log magnitude, or decibels, of attenuation. The horizontal axis represents frequency along a logarithmic scale. Plot 1201 represents frequency response without attenuation from switches. Plot 1202 represents frequency response with attenuation resulting from closure of switches in parallel with the resistors of an AGC input bias network. Plot 1202 shows only slight attenuation relative to plot 1201 for frequencies below approximately 1 MHz. Plot 1202 shows almost no attenuation relative to plot 1201 for frequencies above 1 MHz. Thus, closure of switches in parallel with the resistors of an AGC input bias network is relatively ineffective for attenuation of undesired signals.

Plot 1203 represents attenuation resulting from opening of switches in series with the output of a data head preamplifier circuit. Plot 1203 shows attenuation relative to plot 1201, but less attenuation than plot 1204.

Plot 1204 represents attenuation resulting from closure of switches 608 and 609 and opening of switches 604 and 605 of the read channel input circuit of FIG. 6 when switch sequencing is performed according to the present invention. Plot 1204 shows more attenuation than any other plot for frequencies up to approximately 1 GHz. Thus, the present invention provides superior attenuation of undesired signals.

Thus, a circuit for input switching for a read channel is described.

We claim:

1. A method for improving performance of a storage device read channel comprising the steps of:
   opening a first circuit carrying signals from a data head;
   closing a second circuit providing a low impedance coupling between a bias voltage source and an amplifier input wherein said step of closing said second circuit is performed following a first time period after said step of opening said first circuit opening said second circuit; and
   closing said first circuit, wherein the step of closing said first circuit is performed following a second time period after said step of opening said second circuit.

2. The method of claim 1 wherein said step of opening said first circuit occurs at a beginning of a write mode.

3. The method of claim 2 wherein said step of closing said second circuit occurs at a beginning of a read mode.

4. The method of claim 3 further comprising the steps of:
   opening said first circuit at a beginning of a servo gate transition; and
   closing said second circuit following a third time period after said step of opening said first circuit at said beginning of said servo gate transition.

5. An apparatus comprising:
   a preamplifier circuit for receiving an input signal and for producing a preamplified signal;
   a capacitor coupled to said preamplifier circuit for coupling said preamplified signal;
   a first switching means coupled to said capacitor for switching said preamplified signal;
   an amplifier circuit having an amplifier circuit input coupled to said first switching means for receiving said preamplified signal and for producing an amplified signal at an amplifier circuit output: a second switching means coupled to said amplifier circuit input for selectable coupling said amplifier input circuit to a voltage source, wherein said amplifier circuit comprises an automatic gain control (AGC) amplifier;
   a resistor coupled to said amplifier input and to said voltage source; and
   a control means coupled to said first switching means for opening said first switching means at a beginning of a write mode and for closing said first switching means at a beginning of a read mode.

6. The apparatus of claim 5 wherein said first switching means comprises a metal oxide semiconductor (MOS) device.

7. An apparatus comprising:
   a preamplifier circuit for receiving an input signal and for producing a preamplified signal;
   a capacitor coupled to said preamplifier circuit for coupling said preamplified signal;
   a first switching means coupled to said capacitor for switching said preamplified signal;
   an amplifier circuit having an amplifier circuit input coupled to said first switching means for receiving said preamplified signal and for producing an amplified signal at an amplifier circuit output;
   a resistor coupled to said amplifier input and to a bias voltage source;
   a second switching means coupled across said resistor for selectively bypassing said resistor, wherein said amplifier circuit comprises an automatic gain control (AGC) amplifier; and
   a first control means coupled to said first switching means for opening said first switching means at a beginning of a write mode and for closing said first switching means at a beginning of a read mode.

8. The apparatus of claim 7 further comprising a second control means coupled to said second switching means for closing said second switching means after said first switching means has been opened and for opening said second switching means before said first switching means has been closed.

9. The apparatus of claim 8 wherein said first and second switching means are metal oxide semiconductor (MOS) devices.

10. The apparatus of claim 7 wherein said first control means is further coupled to said second switching means for closing said second switching means after said first switching means has been opened and for opening said second switching means before said first switching means has been closed.

11. The apparatus of claim 10 wherein said first and second switching means are metal oxide semiconductor (MOS) devices.

12. An apparatus comprising:
   a preamplifier circuit for receiving an input signal and for producing a preamplified signal;
   a capacitor coupled to said preamplifier circuit for coupling said preamplified signal;
   a first switching means coupled to said capacitor for switching said preamplified signal;
   an amplifier circuit having an amplifier circuit input coupled to said first switching means for receiving said preamplified signal and for producing an amplified signal at an amplifier circuit output;
   a second switching means coupled to said amplifier circuit input for selectably coupling said amplifier input circuit to a voltage source; and
   a control means coupled to said first switching means for opening said first switching means at a beginning of a write mode and for dosing said first switching means at a beginning of a read mode.

13. The apparatus of claim 12 wherein said amplifier circuit comprises an automatic gain control (AGC) amplifier.

14. The apparatus of claim 12 wherein said first switching means comprises a metal oxide semiconductor (MOS) device.

15. A method for improving performance of a storage device read channel comprising the steps of:
   providing a first switching means for selectably opening a circuit carrying signals from a data head;
   providing a second switching means for selectably coupling said circuit carrying said signals from said data head to a voltage source;
   opening said first switching means a first time period before closing said second switching means;
   maintaining said circuit carrying said signals from said data head in an open state during a write mode of said storage device;
   closing said first switching means a second time period after opening of said second switching means; and
   maintaining said circuit carrying said signals from said data head in a closed state during a read mode of said storage device.

16. The method of claim 15 wherein said step of providing said first switching means comprises a step of providing a complementary metal-oxide semiconductor (CMOS) switch.

17. An apparatus comprising:
   a preamplifier circuit for receiving an input signal and for producing a preamplified signal;
   a capacitor coupled to said preamplifier circuit for coupling said preamplified signal;
   a first switching means coupled to said capacitor for switching said preamplified signal;
   an amplifier circuit having an amplifier circuit input coupled to said first switching means for receiving said preamplified signal and for producing an amplified signal at an amplifier circuit output;
   a resistor coupled to said amplifier input and to a bias voltage source;
   a second switching means coupled across said resistor for selectively bypassing said resistor; and
   a first control means coupled to said first switching means for opening said first switching means at a beginning of a write mode and for closing said first switching means at a beginning of a read mode.

18. The apparatus of claim 17 further comprising a second control means coupled to said second switching means for closing said second switching means after said first switching means has been opened and for opening said second switching means before said first switching means has been closed.

19. The apparatus of claim 18 wherein said first and second switching means are metal oxide semiconductor (MOS) devices.

20. The apparatus of claim 17 wherein said first control means is further coupled to said second switching means for closing said second switching means after said first switching means has been opened and for opening said second switching means before said first switching means has been closed.

21. The apparatus of claim 20 wherein said first and second switching means are metal oxide semiconductor (MOS) devices.

22. An apparatus comprising:
   a preamplifier circuit having a differential preamplifier input and a differential preamplifier output, said differential preamplifier output comprising a first node and a second node, said preamplifier circuit for providing a preamplified signal at said differential preamplifier output;
   a first capacitor coupled to said first node and a third node;
   a second capacitor coupled to said second node and a fourth node, said first and second capacitors for coupling said preamplified signal;
   a first switching means coupled to said third node and a fifth node;
   a second switching means coupled to said fourth node and a sixth node, said first and second switching means for switching said preamplified signal;
   an automatic gain control (AGC) amplifier circuit having a differential AGC amplifier input and a differential AGC amplifier output, said differential AGC amplifier input coupled to said fifth and sixth nodes, said AGC amplifier circuit for amplifying said preamplified signal;
   a first resistor coupled to said fifth node and to a bias voltage source,
   a second resistor coupled to said sixth node and to said bias voltage source, said first and second resistors for coupling said bias voltage source to said fifth and sixth nodes, respectively;
   a third switching means coupled to said fifth node and to said bias voltage source;
   a fourth switching means coupled to said sixth node and to said bias voltage source, said third and fourth switching means for selectively coupling said fifth node and sixth node, respectively, to said voltage source; and
   a control means coupled to said first and second switching means for opening said first and second switching means at a beginning of a write mode and for closing said first and second switching means at a beginning of a read mode.

23. The apparatus of claim 22 wherein said control means is further coupled to said third and fourth switching means for controlling said third and fourth switching means.

24. The apparatus of claim 22 wherein said first, second, third, and fourth switching means are metal oxide semiconductor (MOS) devices.

25. A method for improving performance of a storage device read channel, comprising the steps of:
   opening a first circuit carrying signals from a data head;
   closing a second circuit providing a low impedance coupling between a bias voltage source and an amplifier input,
   wherein said step of closing second circuit is performed following a first time period after said step of opening said first circuit;
   opening said second circuit;
   closing said first circuit wherein said step of closing said first circuit is performed following a second time period after said step of opening said second circuit, wherein said step of opening said second circuit occurs at a beginning of a read mode;
   opening said first circuit at a beginning of a servo gate transition; and
   closing said second circuit following a third time period after said step of opening said first circuit at said beginning of said servo gate transition.

* * * * *